March 12, 1940.   H. P. JACOBSON ET AL   2,193,369
GARDEN AND LAWN SPRINKLER
Filed Sept. 21, 1938

Inventors
H. P. Jacobson
H. K. Day
By Clarence A. O'Brien
and Hyman Berman
Attorneys Patented Mar. 12, 1940

2,193,369

UNITED STATES PATENT OFFICE 2,193,369

GARDEN AND LAWN SPRINKLER

Harry P. Jacobson and Harold K. Day,
Pocatello, Idaho

Application September 21, 1938, Serial No. 231,059

1 Claim. (Cl. 299—73)

This invention relates to sprinkling devices of the type used for sprinkling gardens and lawns and which is adapted to be readily connected with a hose for that purpose.

The present invention together with its objects and advantages will be best understood from a study of the following description taken in connection with the accompanying drawing wherein.

Figures 1, 2:
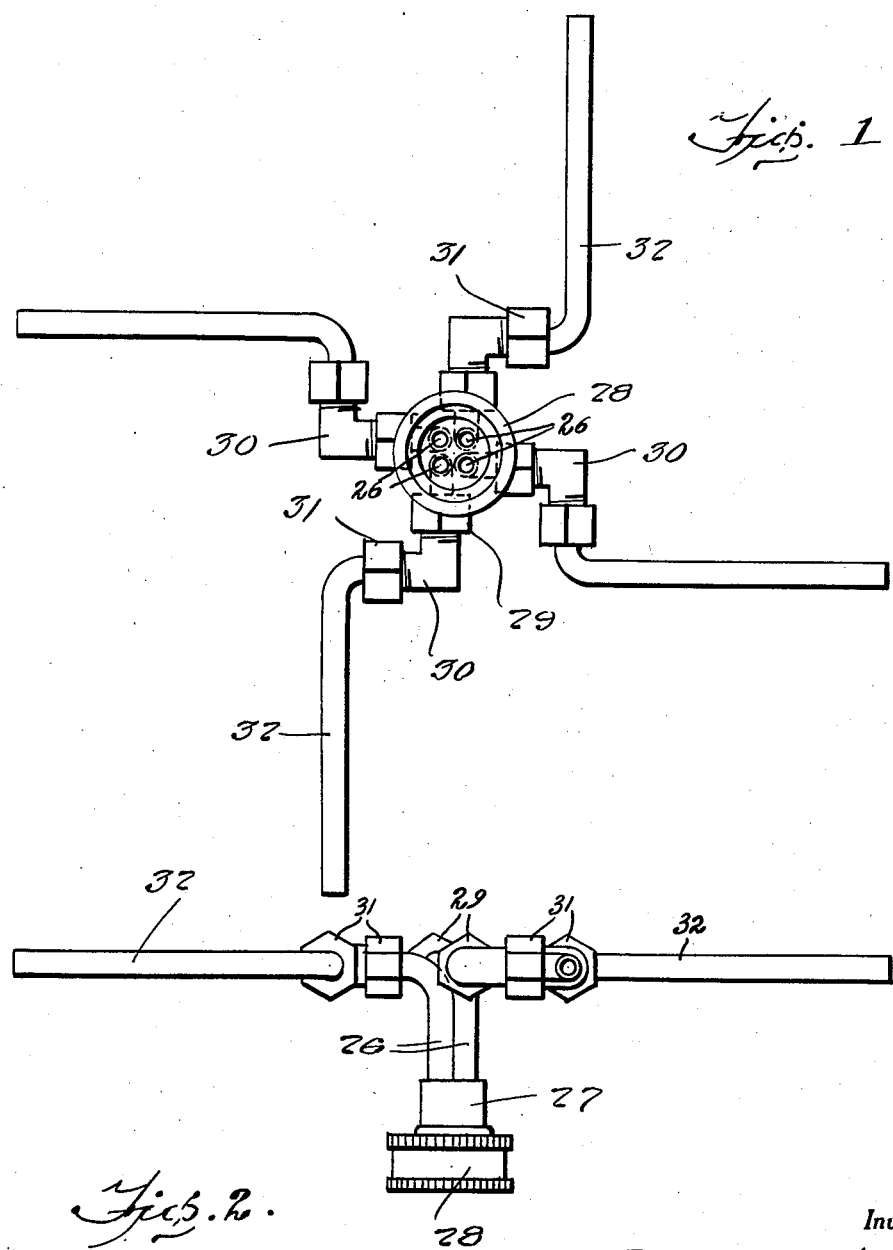
Figure 1 is a bottom plan view of a preferred form of the invention.
Figure 2 is an elevational view of the form of the invention shown in Fig. 1.

Referring more in detail to the drawing, the sprinkler comprises a plurality, in the present instance four substantially L-shaped tubes 26 which at one end are welded or otherwise secured to a head 27 that in turn has swivelly connected therewith a coupling nut 28 through the medium of which the sprinkler is connected with one end of a hose.

At the free end thereof the tubular members 26 have connected thereto through the medium of coupling nuts 29 elbows 30. Connected to the elbows 30 through the medium of coupling nuts 31 are nozzles 32.

The nozzles 32 may be swung to any rotative position of adjustment relative to the respective elbows 30 and secured at the desired position of adjustment through the medium of the coupling nuts 31 as is obvious.

Thus it will be seen that the nozzles 31 may be secured either in a substantially horizontal position, or in a vertical position, or at any angle to the horizontal as found desirable.

The numerous advantages of a sprinkler embodying the features of the present invention may be set out as follows:

*First.*—Corner sprinkling. Operator can sprinkle a corner and confine all spray to grass or garden area—not wetting sidewalks nor pedestrians.

*Second.*—Rectangular area. Operator can face the sprays in one direction and sprinkle parquing without waste of water.

*Third.*—Slopes. If operator has to sprinkle hillside or an elevation then these nozzles can play at any angle up or down and a greater or less quantity of water used on hill or slope by turning one or more spray units away from slope thus using only one or as many as are needed to water where water would run off if applied freely.

*Fourth.*—Over-under jet sprays for shrubs or plants. Operator can water up or down, over or under trees, shrubs or plants by simply turning nozzle units as desired. Occasionally some tree or shrub is in immediate path of sprinkler in which case the foregoing spray is obtainable.

*Universal adaptation.*—Triangles, rectangles and all irregular portions of garden or lawn can be exactly sprinkled under all conditions where reasonable pressure as needed for any sprinkler is obtainable.

It will also be understood that in actual practice the coupling nut hereinbefore referred to will be packed with any suitable flexible material embodying asbestos, or its equivalent, or metal ferrules.

It is thought that a clear understanding of the construction, utility, advantages, and manner of operation of an invention of this character will be had without a more detailed description.

Having thus described the invention what is claimed is:

A sprinkler head for use on a hose comprising a coupling for attachment to said hose, a plurality of L-shaped pipe sections having shanks fixed to said coupling and extending forwardly therefrom in parallel relation, said shanks having out-turned terminals radial to the coupling and equidistantly spaced apart in a common plane, elbow fittings on the outer ends of said terminals disposed in said common plane, and right-angled pipe-like nozzle members rotatably mounted at one end in said fittings, respectively, for variable adjustment thereon about axes at right angles to the axes of said terminals.

HARRY P. JACOBSON.
HAROLD K. DAY.